(12) United States Patent
Vaughn et al.

(10) Patent No.: US 10,701,462 B2
(45) Date of Patent: Jun. 30, 2020

(54) GENERATING VIDEO MONTAGE OF AN EVENT

(71) Applicant: International Business Machines Corporation, Armonk, NY (US)

(72) Inventors: Garfield Vaughn, South Windsor, CT (US); Moncef Benboubakeur, Brno (CZ); Julija Narodicka, Brno (CZ); Diwesh Pandey, Bangalore (IN); Aaron K. Baughman, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/951,768

(22) Filed: Apr. 12, 2018

(65) Prior Publication Data
US 2019/0320242 A1    Oct. 17, 2019

(51) Int. Cl.
*H04N 7/16* (2011.01)
*G06F 3/00* (2006.01)
(Continued)

(52) U.S. Cl.
CPC ... *H04N 21/8549* (2013.01); *H04N 21/21805* (2013.01); *H04N 21/23439* (2013.01);
(Continued)

(58) Field of Classification Search
CPC ......... H04N 21/8549; H04N 21/21805; H04N 21/23439; H04N 21/252; H04N 21/25435; H04N 21/4223; H04N 21/816
See application file for complete search history.

(56) References Cited

U.S. PATENT DOCUMENTS

| 5,928,327 A | 7/1999 | Wang et al. |
| 9,583,144 B2 | 2/2017 | Ricciardi |

(Continued)

FOREIGN PATENT DOCUMENTS

| CN | 104392416 B | 2/2017 |
| WO | 2015131126 A1 | 9/2015 |
| WO | 2016202890 A1 | 12/2016 |

OTHER PUBLICATIONS

Alamares, M., "Enhancing Live Streaming with Mixed Reality", Sep. 2016, 3 pages, http://www.streamingmedia.com/Articles/Editorial/Featured-Articles/Enhancing-Live-Streaming-with-Mixed-Reality-113262.aspx.
(Continued)

*Primary Examiner* — Kyu Chae
(74) *Attorney, Agent, or Firm* — Scully, Scott, Murphy & Presser, P.C.; Nicholas Bowman, Esq.

(57) ABSTRACT

A method, system and computer readable program storage device for generating a video stream of an event. In an embodiment, the method comprises receiving an input video stream from each of a plurality of persons at different locations at the event; generating a combined video stream of the event from the plurality of input video streams by joining together at least a portion of each of the input video streams, wherein each of the input video streams shows a defined focal point of the event; streaming the combined video stream to viewers; and paying each person of the plurality of persons based at least partially on a portion of the combined video stream that incorporates a portion of the input video stream from the each person. In an embodiment, the combined video stream is a 360 degree montage of the event.

17 Claims, 4 Drawing Sheets

(51) Int. Cl.
*G06F 13/00* (2006.01)
*H04N 5/445* (2011.01)
*H04N 21/8549* (2011.01)
*H04N 21/4223* (2011.01)
*H04N 21/81* (2011.01)
*H04N 21/25* (2011.01)
*H04N 21/218* (2011.01)
*H04N 21/2343* (2011.01)
*H04N 21/2543* (2011.01)

(52) U.S. Cl.
CPC ..... *H04N 21/252* (2013.01); *H04N 21/25435* (2013.01); *H04N 21/4223* (2013.01); *H04N 21/816* (2013.01)

(56) References Cited

U.S. PATENT DOCUMENTS

| | | | | |
|---|---|---|---|---|
| 2005/0049971 | A1* | 3/2005 | Bettinger | G06Q 30/02 |
| | | | | 705/51 |
| 2007/0118873 | A1* | 5/2007 | Houh | G06F 17/30746 |
| | | | | 725/136 |
| 2010/0273463 | A1* | 10/2010 | Bonnefoy | H04W 24/00 |
| | | | | 455/414.1 |
| 2014/0184850 | A1 | 7/2014 | Raju et al. | |
| 2014/0325537 | A1* | 10/2014 | Garg | H04N 21/2543 |
| | | | | 725/4 |
| 2016/0173436 | A1* | 6/2016 | Koolwal | H04L 51/32 |
| | | | | 709/206 |
| 2016/0191591 | A1* | 6/2016 | Rider | G06F 17/30 |
| | | | | 709/219 |
| 2017/0289617 | A1* | 10/2017 | Song | H04N 21/44008 |
| 2018/0108171 | A1* | 4/2018 | Pio | G06T 15/20 |
| 2018/0159913 | A1* | 6/2018 | Barnett | H04L 65/601 |
| 2018/0181909 | A1* | 6/2018 | Wilkinson | G06F 17/3056 |
| 2018/0367820 | A1* | 12/2018 | Abulikemu | H04N 21/2187 |

OTHER PUBLICATIONS

"How to verify photos and videos on social media networks", Nov. 10, 2015, 4 pages, http://observers.france24.com/en/20151110-observers-guide-verifying-photos-videos-social-media-networks.

"NextVR: Virtual 360 Degree Video Live Broadcasting", printed on Apr. 12, 2018, 5 pages, https://virtualrealityreporter.com/virtual-360-degree-video-nextvr/.

* cited by examiner

GENERATING VIDEO MONTAGE OF AN EVENT

BACKGROUND

This invention generally relates to creating a video stream of an event, and more specifically, to creating a video stream based on the video input from a plurality of persons at the event.

Usually, at major events (such as sports events, concerts, etc.), many people take videos of what is happening. Individually, these videos are valuable primarily only to the persons creating them and to a small group of family and friends who they may show the videos to. Monetizing these videos is difficult because of many reasons including, for example, the quality of the videos, the professionalism of the persons taking the videos, and each video is taken from just one angle. Currently, only event organizers, professional media companies, promoters, and facility owners share in the revenue for videos created at these events. For consumers, they are limited to being able to view these videos only if an entity in the country purchases the rights to broadcast the videos.

This arrangement has a number of significant disadvantages. For instance, typically, there is no way to monetize the video that an individual has taken, and there is no way for individuals who are not present at the event to have a similar or virtual reality experience. In addition, an individual at the event is only able to experience the event from a limited viewing angle, post video creation is time consuming and requires expert skills, and the video angles are limited. Further, there is no way to create an attendee perspective— professional videographers at an event are usually in fixed locations and do not cover the full area of the event. Alternative was to make the video available at significantly lower cost than what exists.

SUMMARY

Embodiments of the invention provide a method, system and computer readable program storage device for generating a video stream of an event. In an embodiment, the method comprises receiving an input video stream from each person of a plurality of persons at different locations at the event; generating a combined video stream of the event from the plurality of input video streams by joining together at least a portion of each of the plurality of input video streams, wherein each of the plurality of input video streams shows a defined focal point of the event; streaming the combined video stream to specified viewers; and paying each person of the plurality of persons based at least partially on a portion of the combined video stream that incorporates the at least a portion of the input video stream from the each person.

In an embodiment, the paying each person of the plurality of persons based at least partially on a portion of the combined video stream includes paying each person of the plurality of persons based on a number of the specified viewers that watch said portion of the combined video stream.

Embodiments of the invention provide a system based on the input from multiple users at the event to create a real live experience broadcast almost in direct time and with the possibility to montage and navigate within the system.

Embodiments of the invention provide a system that allows individuals attending events (such as concerts and sports events) to video record the event, and this recording is used to produce a 360 degree montage video of the event. In embodiments of the invention, the videos are made available for viewing by any one throughout the world, and individuals are able to pay to watch these videos. Once payment is made by the consumers, the revenue is distributed to all the individuals whose videos were used in the creation of the montage, based on the guidelines of a contract.

The videos that are captured by the users are streamed and stored in the system; and based on specific attributes (including quality, time, and location) of the videos, the system selects videos that are used to create the 360 degree montage. In embodiments of the invention, users of the system who are capturing videos are required to accept a specified contract, referred to as a Smart Contract. This contract defines how revenue will be distributed.

In embodiments of the invention, the system's ability to produce the montage over time is improved from training.

In embodiments of the invention, there are three ways of using the system:
1. A viewer selects a 360 degree montage video they would like to watch—no further involvement from the user is required;
2. A viewer is able to watch from one location in the event, and then navigate the point of view within the video montage (via a keyboard/mouse/finger) to view from other locations at the event;
3. The viewer is equipped with Augmented Reality equipment that connects to one of the cameras that is recording the event; and according to the movements of the viewer, the viewer is able to move the viewpoint around the event, as if the viewer was physically at the event.

Embodiments of the invention have significant advantages. For instance, with embodiments of the invention, people have a way of monetizing their videos regardless of video quality or location in an event; and consumers in places where the video would normally not be available, now have an opportunity to view the video. Further, the producer of an event has a new revenue stream, reaching new markets. Also, embodiments of the invention provide the ability to view a production of a 360 degree montage video of an event in near real-time as the event is occurring. In addition, attendees of the event will be able to view the event from locations other than where they were physically located, regardless of where they were physically located at the event.

Embodiments of the invention may be used to provide a secured production of the final, 360 degree montage of the event. A system, in embodiments of the invention, ensures that all the individual videos used to create the montage are authentic and from the time and location of the event. In embodiments of the invention, multiple videographers are collaborating securely to produce a 360 degree montage without knowing each other.

Embodiments of the invention enable automatic montage creation from multiple videos of an event without human involvement, and enable streaming videos of an event in 360 degrees in near real-time.

Embodiments of the invention provide an augmented reality presence in near real-time using social video streaming and enable a person physically to attend an event while also being able to watch the event from different locations.

DETAILED DESCRIPTION

Figure 1:
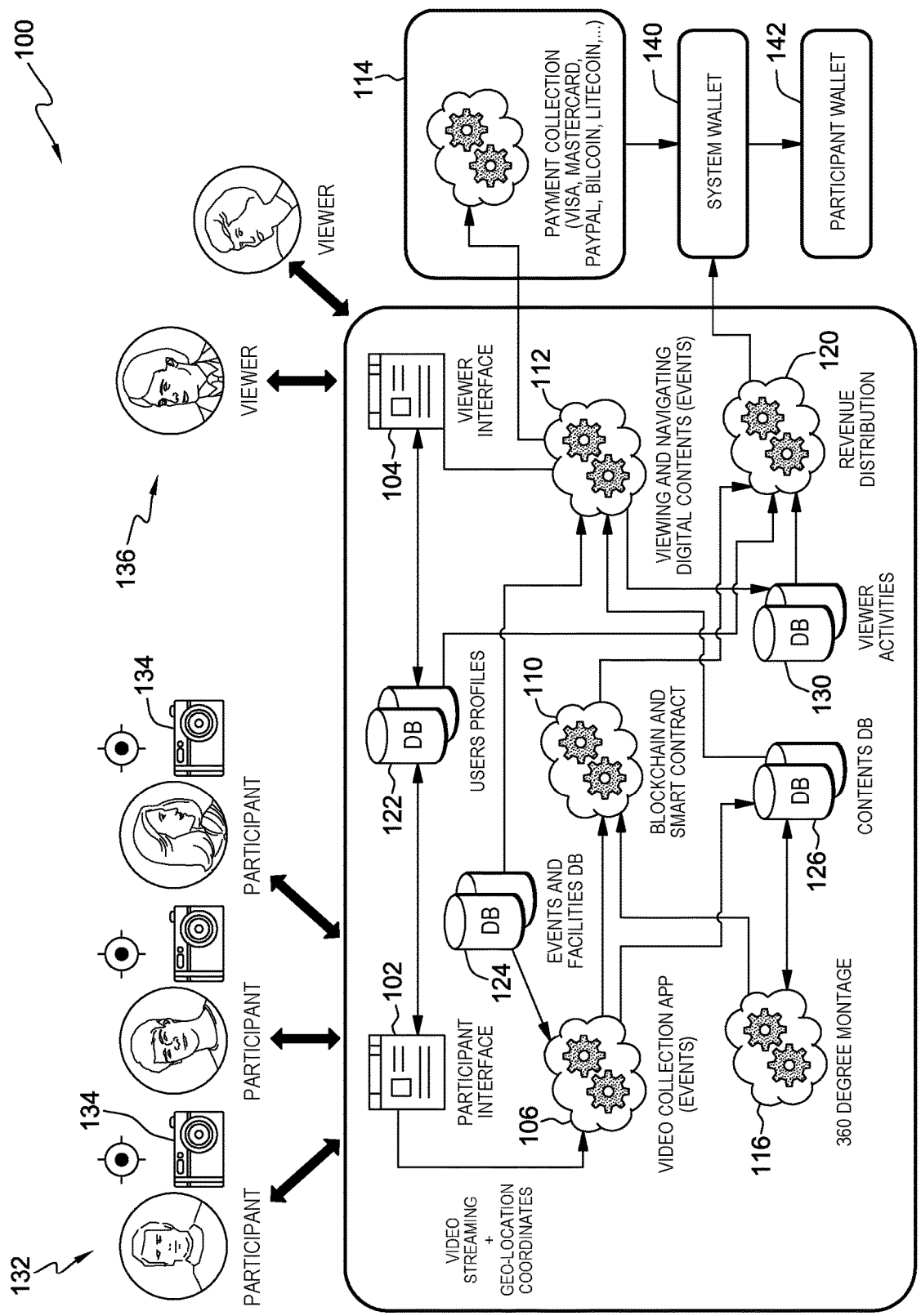
FIG. 1 shows components of an embodiment of the invention.

FIG. 1 shows components of a system 100 in accordance with an embodiment of the invention. Generally, system 100 comprises participant user interface 102, viewer user interface 104, video collection component 106, blockchain and smart contract component 110, viewing and navigating digital content component 112, and payment collection component 114. This embodiment of system 100 also comprises 360 degree montage component 116, distribution of revenue component 120, user profile DB 122, events and facilities DB 124, content DB 126, and viewer activities DB 130. FIG. 1 also shows a group of participants 132, each of which has a video recording device 134, and a group of viewers 136.

In embodiments of the invention, participants 132 who would like to stream video of an event use the participant interface 102 that is available. Before streaming any content, the participant 132 is required to accept the terms of a specified contract, referred to as the smart contract. The system 100 automatically determines which facility and event the participant is attending, in addition to the seat location of the participant within the facility, using an indoor/outdoor location identification system (which, in turn, may comprise IoT, or LED based indoor positioning system). The system 100 may also use data from the events and facilities DB 124.

Viewers 136 use a viewer interface 104, where they search for an event, determine how they would like to watch the event, and select the method of payment. After completing a transaction, the viewer uses this same interface to watch the selected video.

Video collection component 106 is the system that captures and stores all the video streams coming from participants 132 who are video recording an event. Each stream has a video ID, a participant ID and a geolocation value for the video. The videos being captured by this component 106 along with the video IDs are stored in the content DB 126. Additionally, the video collection component 106 stores the participant ID, video ID, event ID, geolocation value, seat location, date and time stamp in the blockchain component 110.

The blockchain component 110 stores the participant ID, video ID, event ID, facility ID, seat ID, geolocation value, and date and time stamp. Periodically, a new block is created which contains all the records for all the videos that have been streamed since the previous block was created.

The viewing and navigating component 112 is the main user component for the viewer. The viewers 136 are able to define and manage their profile information, where they select and identify their method of payment. The viewers 136 use this component 112 to search for content to watch that is located in the content DB 126. Once they have found the event they would like to watch, the viewers 136 select the method of watching: 360 degree montage, manually controlled, or augmented reality. The viewers then begin watching. While a viewer watches and navigates through different video streams of an event, the system 100 stores in the viewer activities DB 130, the viewer ID, video ID and duration, and date and time stamp. This information is used to calculate payments due to participants 132 whose videos have been watched.

The payment collection component 114 is linked to external banking systems using their APIs. Once payment is received from the viewer, the funds are transferred to the system wallet 140. The participants receive the funds at the participant wallet 142.

The system 100 selects the videos streams that are used in the creation of the 360 degree montage from the content DB 126, and the system 100 edits the video streams, joins the video streams together, and adds some filter if necessary or desired.

This process can be done for the whole event or for a portion of the event. For example, the system 100 may create a montage for the first five minutes of the event and publish this montage in the content DB 126 before the system starts working on the montage for the next five minutes of the event. This allows viewers 136 to start watching the event during production of the montage.

The system 100 uses a methodology to select videos to be included in the 360 Degree montage. In embodiments of the invention, this methodology is based on a number of factors including, for example, the participant popularity, viewer feedback (such as written, emotion, images, popularity of the video stream, and event hotspot, which is the location of the main action in the event.

Before the event begins, the system 100 assesses and determines which participants 132 are present and obtains their popularity values from the user profile DB 122. As viewers 136 are watching video streams of the event, the viewers have the ability of providing feedback. The feedback, in embodiments of the invention, is processed using a cognitive natural language component, extracting keywords, sentiment and mood. The system 100 monitors and determines the popularity of individual video streams being watched by viewers 136. The popularity of a video stream is based, for example, on the number of viewers watching the stream, the average viewing time, and total viewing time for each stream.

The system 100 also detects the event hotspot. Because the system 100 knows where each participant 132 is located and the direction of each camera (based on the video being streamed), the system 100 is able to determine the point of convergence of the video streams, which is considered as the event hotspot. The system is then able to determine whether a stream is showing content that is within the area of the event hotspot. All these parameters are weights used by the system 100 to select the videos to be included in the 360 Degree montage.

In embodiments of the invention, the system 100 produces two types of 360 degree montage—a near real time montage, and a post event production montage. The near real time montage is generated shortly after the event begins and participants 132 begin streaming video of the event. The post production montage version is generated after the event has ended, and this version is repeatedly revised based on some set frequency (daily, weekly, monthly), to produce versions of the video montage using the latest popularity and feedback information received from the viewers 136. Each newer version produced of the montage is an improvement on the prior version.

Figure 2:
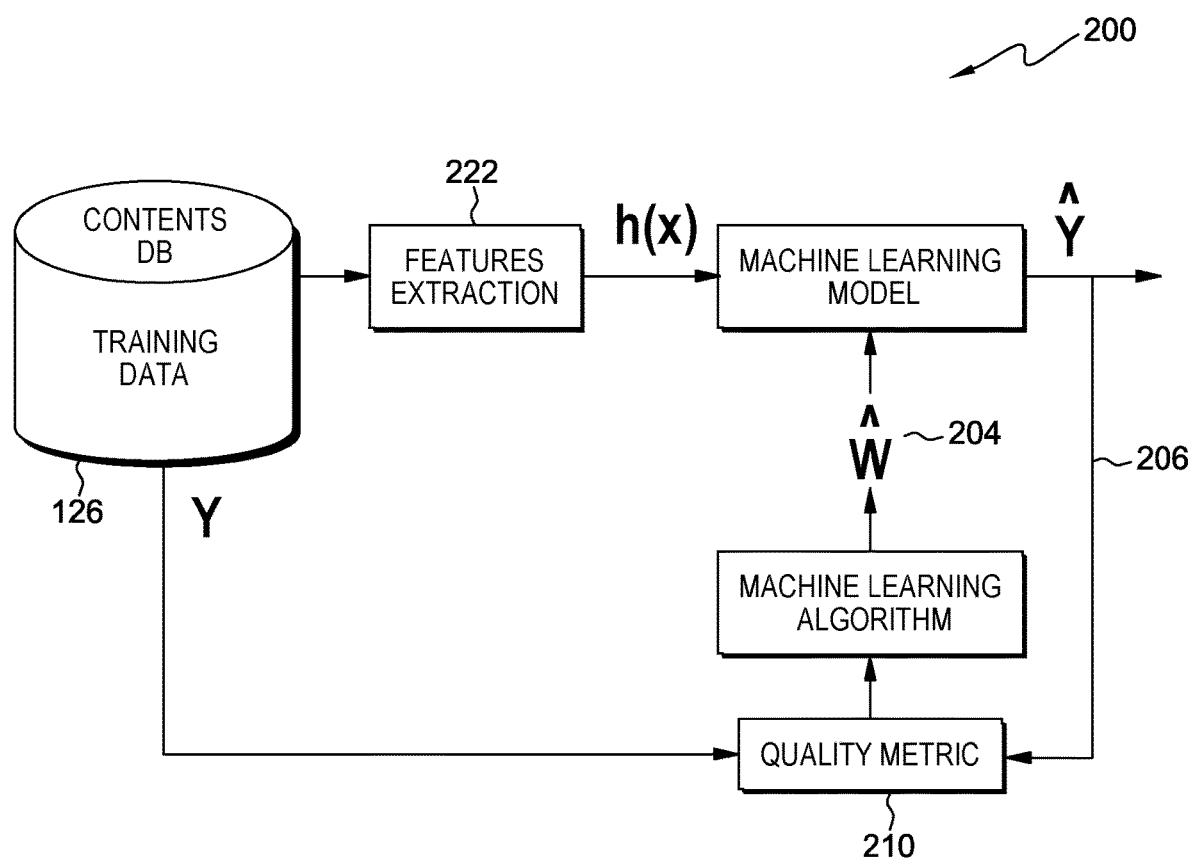
FIG. 2 illustrates a training system and procedure that may be used to train the system of FIG. 1 to produce a video in accordance with an embodiment of the invention.

FIG. 2 illustrates a training system 200 and procedure that may be used to train system 100 to produce a video montage in accordance with an embodiment of the invention. To train the system 100 to produce a montage, videos from multiple events are used. Owners or users of the system 100 capture videos from different seating locations of a real event and these videos 202 are input to the system. An additional input is the expected video output 204 that is produced by video experts using the same set of input videos. The system uses (deep) learning to produce the system's video. After the video is produced by the system, the video experts provide feedback 206. This feedback is used by the system to improve the ability of the system to produce video (for example, by changing the weights inside the deep learning system). This method of training continues, using input videos from other events, until the system has the ability to produce the 360 degree montage similar to the videos produced by experts.

In embodiments of the invention, funds are collected from viewers 136 who may pay based on a subscription model or on a per-view basis, using the terms and conditions information from an agree upon contract. Payment may be based, for instance, on the amount of minutes watched.

One way of calculating the revenue for each participant 132 is to count the minutes of one of videos streamed by the participant that are watched by the viewers 136, and multiply this number by a price of each minute watched. One parameter that can impact the revenue received by participants is a fee imposed by the organizer of the event for permitting video streaming of the event. This fee, which may be a percentage, is deducted from the participant's revenue. A parameter that may impact the overall revenue received is the streaming quality. The quality of the video stream has an impact on the amount of revenue received, thus impacting the funds that will be available for distribution to the participants 132 and the event organizer when the video is viewed. All these conditions may be described on the agreed upon, smart contract for each event separately.

In embodiments of the invention, there are two ways the video stream uploaded by a participant 132 can generate revenue:
1. Viewers 136 directly watching the video stream of the participant when the viewers are navigating the viewpoint manually inside the event;
2. The video stream of the participant 132 is used in the 360 degree montage.

In embodiments of the invention, the participants 132 receive some revenue from any content they have provided to the content DB 126 and that was viewed by a viewer 136. As long as the content is available in the content DB and viewers are still watching the videos (streaming or part of 360 montage), the participant continues to receive revenue.

One possible implementation of this algorithm is:
1. Participant Revenue by event=((Sum of minutes watched) *($ price for minute)*(Quality of the steam))−(% share of event organizer);
2. Participant Revenue by period of time=Sum of participant revenue for each event streamed by the user;
3. Event Organizer Revenue=(Sum of the event organizer shares for all participants streaming videos of this particular event).

A practical example of how to calculate the revenue of one participant for one event for one month during which 200 viewers watched parts of the video stream from one participant, which generated 500 minutes of watched time, is given below:
1. Revenue by minute watched=$0.50,
2. Quality of the stream (medium)=0.6,
3. Event organizer share=10%,
4. Participant Revenue=(500*$0.50*0.6*0.9)=$135.

In embodiments of the invention, the user profile dB 122 contains profile information about participants 132 and viewers 136. The user's name, ID, address (includes country), personal preferences, account type (pay-per-view or periodic subscription) bank account, user popularity, and age are examples of the data being stored. The user has control over what of their personal information they will make available for the public to see.

The events and facilities DB 124 stores data about each event. The name of the event, type of event, the facility ID where the event is happening, the date and time of the event may be stored in this database. In embodiments of the invention, each facility is defined in the DB 124 with at least the following: ID, Name, Location, Seating Charts. The system 100 uses the events and facilities data to support both viewer and participant viewing and video streaming functions. Details about the seat position of each video being streamed are available for the viewer 136 to see when watching videos, and the system 100 has details about the facility and events that can be associated with the video as the video is being captured. This ensures that the captured content is authentic and the location and event details are valid.

In embodiments of the invention, all videos being captured and streamed by participants are stored in the content DB 126. In addition to the video content, each record stored in this DB 126 has a video ID. Using the video ID, the system 100 can get details by searching the blockchain. In the blockchain, the following data can be found using the video ID—participant ID, event ID, facility ID, seat ID, geolocation, date and time stamp. The videos in the content DB 126 are used by the 360 Degree Montage and Viewing component 116 and the Navigating Digital Contents component 112. Additionally, the results of the 360 Montage are also stored in the content DB 126.

In embodiments of the invention, all viewing activities of each viewer 136 are store in the viewer activities DB 130. Each record stored in this DB 130 contains the user ID, Video ID, date and time stamp, and viewing time. This information is used by the system 100 to calculate the revenue to be distributed to each participant 132. The system 100 may also use this information to learn about a viewer's behavior and present suggestions of videos to be watched in the viewer user interface 104.

Figure 3:
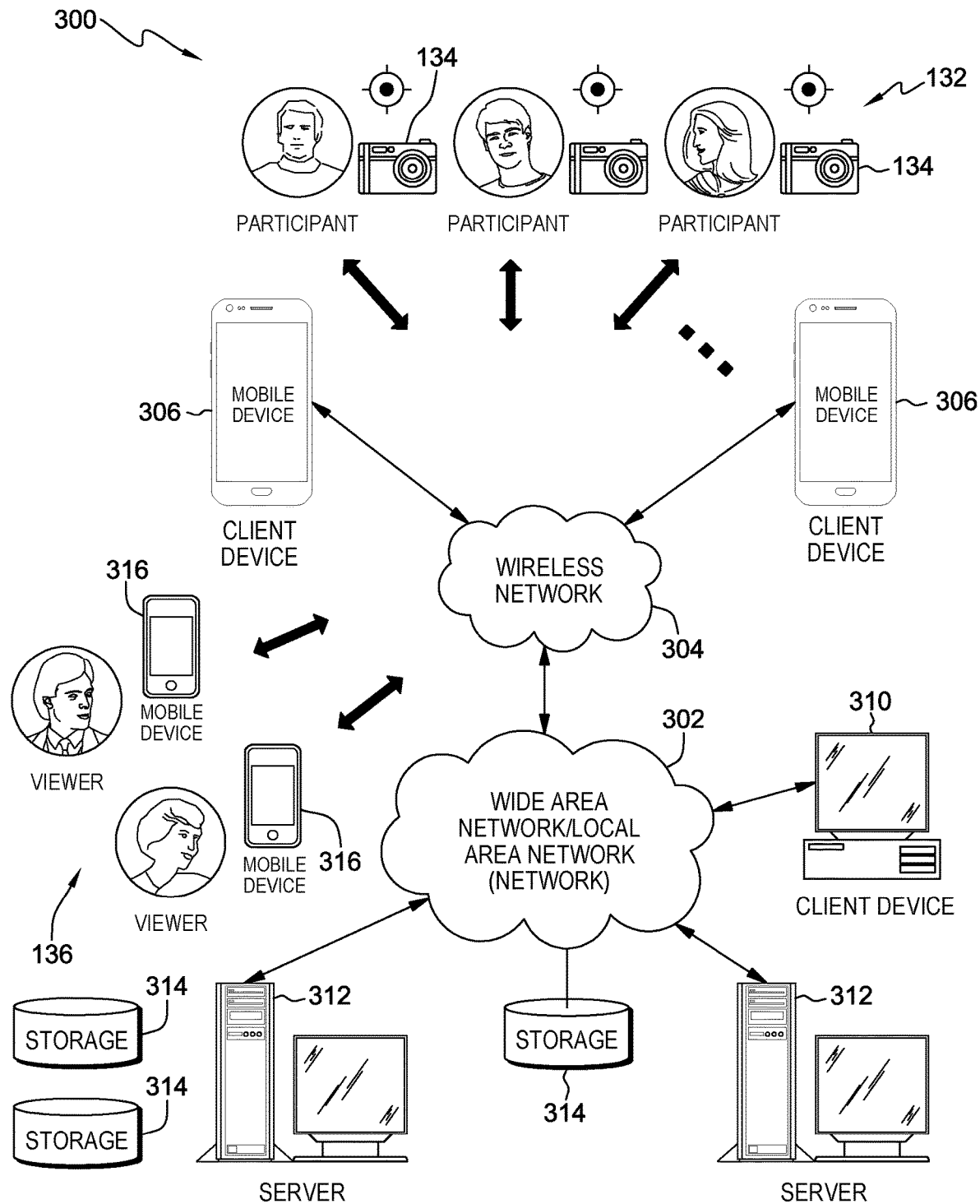
FIG. 3 is a schematic diagram of a computer network that may be used in the practice of embodiments of this invention.

FIG. 3 shows components of a computing network 300 that may be used in embodiments of the invention. As shown, network 300 of FIG. 3 includes local area networks ("LANs")/wide area network 302, wireless network 304, mobile devices 306, client device 310, servers 312, and data storage devices 314. FIG. 3 also shows participants 132 and viewers 136. As shown in FIG. 3, each of the participants 132 has a video recording device 134, and each of the viewers 136 is connected to the network 300 by a viewing device 316.

Generally, mobile devices 306 may include virtually any portable computing device that is capable of receiving and sending a message over a network, such as networks 302 and wireless network 304. Such devices include cellular telephones and smart phones. Mobile devices 306 may also include Personal Digital Assistants (PDAs), handheld computers, laptop computers, wearable computers, tablet computers, integrated devices combining one or more of the preceding devices, and the like. As such, mobile devices 306 typically range widely in terms of capabilities and features.

Wireless network 304 is configured to couple mobile devices 306 and their components with network 302. Wireless network 304 may include any of a variety of wireless sub-networks that may further overlay stand-alone ad-hoc networks, and the like, to provide an infrastructure-oriented connection for mobile devices 306. Such sub-networks may include mesh networks, Wireless LAN (WLAN) networks, cellular networks, and the like.

Recording devices 134 are used to record video streams of an event. Each of the recording devices may capture an image utilizing, for example, an integrated image capture device (such as a video camera), and may thus generate a video stream that is transmitted to network 304.

A device operating as a video recording device may generate multiple video streams such that a recording device may be connected to the network via multiple streams.

Each of the viewing devices 316 is used to view video streams. However, the devices 316 are not limited to providing viewing of content, and may have other functionality and purposes. In examples, each viewing device may be a mobile device such as a mobile phone. The viewing devices may be associated with a display, such as an integrated display, for viewing the video streams provided to the devices 316. A viewing device may be arranged in order to receive multiple video streams from network 304.

Each recording device and viewing device may be connected to the network 304 in a manner that enables bi-directional communications, and thus, for example one or all of the viewing devices may provide a signal to the network in order to provide a feedback or control signal to the servers 312 Likewise, the servers 312 may provide control signals to the network 304 in order to provide control signals to one or more of the recording and viewing devices.

A single device may be both a video recording device and a viewing device. Thus, for example, a mobile phone device may be enabled in order to operate as both a video recording device and a viewing device.

Client device 310 represents other suitable computing or processing devices that may be used in network 300. For instance, the client device 310 may comprise a personal computer, laptop computer, handheld computer, tablet computer, or Personal Digital Assistant) PDA). Device 305 may also include cellular telephones, smart phones, wearable computers and the like.

The servers 312 are configured to receive inputs from the recording devices 134; and in embodiments, the servers receive a plurality of video streams from the recording devices. The servers may process the video streams received from the recording devices, in the manner discussed above.

Servers 312 include virtually any device that may be configured to provide an application service in network 300. Such application services or simply applications include, but are not limited to, email applications, search applications, video applications, audio applications, graphic applications, social networking applications, text message applications, or the like. In one embodiment, servers 312 may operate as web servers. However, servers 312 are not limited to web servers.

Storage devices 314 may comprise any suitable data storage devices, and the devices may be directly connected to one or more of the servers 312, or the storage devices may be accessed via network 302.

Network 302 is enabled to employ any form of computer readable media for communicating information from one electronic device to another. Also, network 302 can include the Internet in addition to local area networks (LANs), wide area networks (WANs), direct connections, such as through a universal serial bus (USB) port, other forms of computer-readable media, or any combination thereof.

A web-enabled mobile device used in or with network 300 may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices used in or with network 300 may each receive messages sent from servers 312, from one of the other mobile devices 306, or even from another computing device. Mobile devices 306 may also send messages to one of servers 310, to other mobile devices, or to client device 310, or the like. Mobile devices 306 may also communicate with non-mobile client devices, such as client device 310, or the like.

Those of ordinary skill in the art will appreciate that the architecture and hardware depicted in FIG. 3 may vary. Not all the illustrated components may be required to practice the invention, and variations in the arrangement and type of the components may be made without departing from the spirit or scope of the invention.

Figure 4:
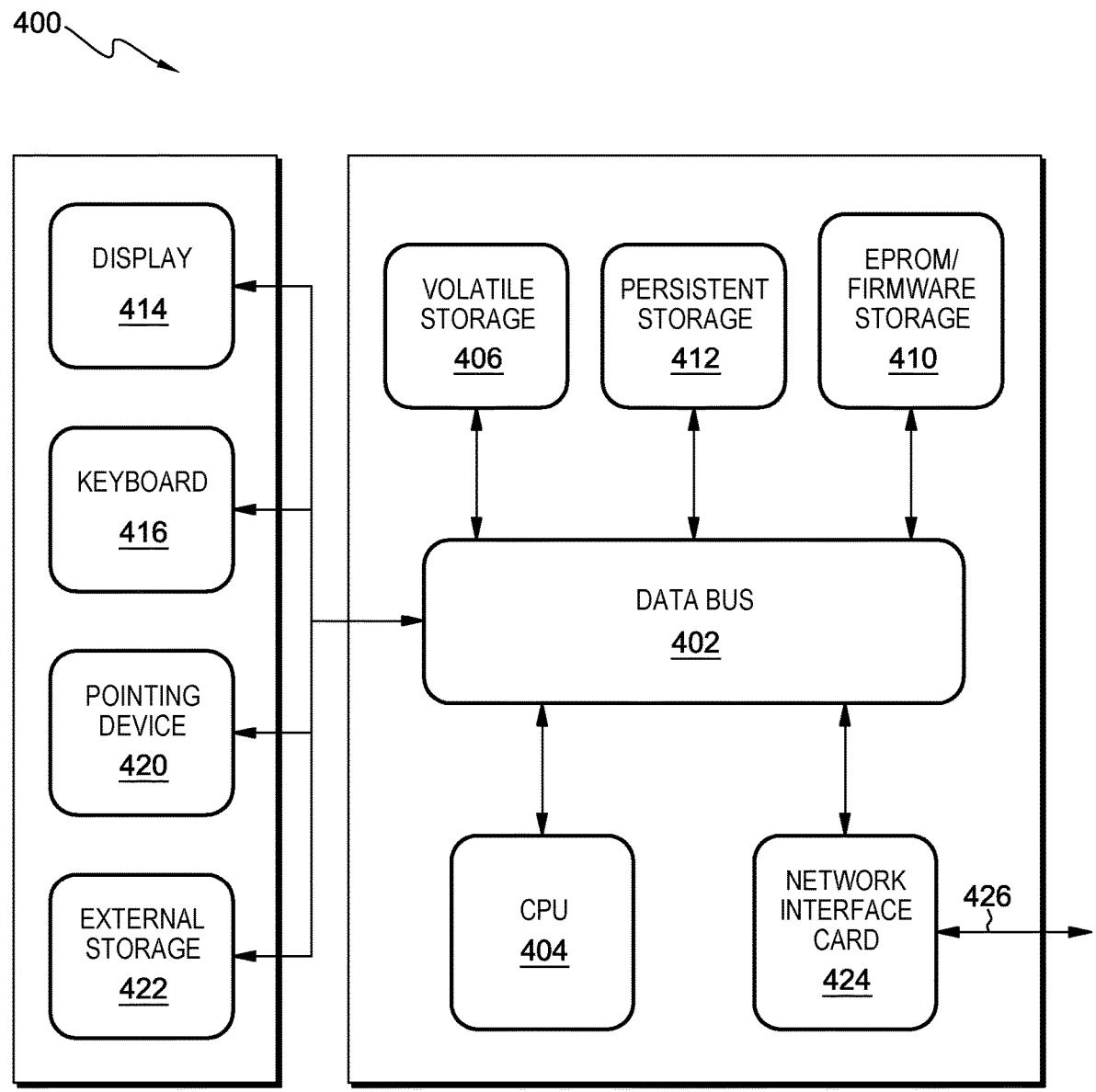
FIG. 4 is a schematic view of a computer that may be used in the network of FIG. 3.

FIG. 4 is a block diagram that illustrates an embodiment of a computer or processing unit 400 that may be used in the present invention. Computer 400 may be used, for example, in video recording devices 134, in mobile devices 306 or 316, in client device 310, or in servers 312 of FIG. 3.

The computer 400 may include a data bus 402 or other communication mechanism for communicating information across and among various parts of the computer, and a central processor unit (CPU) 404 coupled with bus 402 for processing information and performing other computational and control tasks. Computer 400 also includes a volatile storage 406, such as a random access memory (RAM) or other dynamic storage device, coupled to bus 402 for storing various information as well as instructions to be executed by the CPU 404. The volatile storage 406 also may be used for storing temporary variables or other intermediate information during execution of instructions by CPU 404.

Computer 400 may further include a read only memory (ROM or EPROM) 410 or other static storage device coupled to bus 402 for storing static information and instructions for CPU 404, such as basic input-output system (BIOS), as well as various system configuration parameters. A persistent storage device 412, such as a magnetic disk, optical disk, or solid-state flash memory device is provided and coupled to bus 402 for storing information and instructions.

Computer 400 may be coupled via bus 402 to a display 414, such as a cathode ray tube (CRT), plasma display, or a liquid crystal display (LCD), for displaying information to a system administrator or user of the computer. An input device 416, including alphanumeric and other keys, may be coupled to processing unit 400 for communicating information and command selections to CPU 404. Another type of user input device is cursor control device 416, such as a mouse, a trackball, or cursor direction keys for communicating direction information and command selections to computer 400 and for controlling cursor movement on display 414. This input device typically has two degrees of freedom in two axes, a first axis (e.g., x) and a second axis (e.g., y), that allows the device to specify positions in a plane.

An external storage device 422 may be connected to the computer 400 to provide an extra or removable storage capacity for the computer. In an embodiment of the computer 400, the external removable storage device 422 may be used to facilitate exchange of data with other computer systems.

Computer 400 may also include or interact with additional subsystems such a speaker, a microphone, a camera, sensors, and other subsystems. The sensors can include an accelerometer, a tilt sensor, a proximity sensor, a magnetometer, a pressure sensor (none of which are specifically shown). In addition, the display 414 can be a touch-screen display able to receive inputs through a user's touch. Some of the subsystems of computer 400 perform communication-related functions, whereas other subsystems may provide resident or on-device functions. By way of example, display 414 and input device 416 may be used for both communication-related functions, such as entering a text message for transmission over a wireless network, and device-resident functions such as a calculator or task list.

The computer 400 also includes a communication interface, such as network interface 424 coupled to the data bus 402. Communication interface 424 provides a two-way data communication coupling to a network link 426. Network link 426 typically provides data communication through one or more networks to other network resources. For example, network link 426 may provide a connection through a local network to a host computer, or to a network storage/server. Additionally or alternatively, the network link 96 may connect to the wide-area or global network, such as an Internet. Thus, the computer 400 can access network resources located anywhere on the Internet, such as a remote network storage/server. In addition, the computer may also be accessed by clients located anywhere on the local area network and/or the Internet.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention.

The invention claimed is:

1. A computer-implemented method of generating a video stream of an event, comprising:
    receiving, by one or more processor units, an input video stream from each person of a group of persons at different locations at the event;
    generating, by the one or more processor units, a combined video stream of the event from the input video streams, including
        for each of the input video streams, determining whether the each input video stream shows content within an area of a point of convergence of the received input video streams,
        selecting for the combined video stream, a plurality of the input video streams showing content in the area of the point of convergence, including selecting the plurality of the video streams based on popularity values of the persons of said group of persons, wherein the plurality of input video streams are from a plurality of persons of said group of persons, and
        joining together at least a portion of each of the plurality of input video streams to form the combined video stream of the event;
    streaming the combined video stream to specified viewers; and
    paying each person of the plurality of persons based at least partially on a portion of the combined video stream that incorporates the at least a portion of the input video stream from the each person, including
        counting an amount of time each of the specified viewers watches the combined video stream, and
        paying each person of the plurality of persons based on the counted amount of time the specified viewers watch the combined video stream; wherein:
    the generating a combined video stream of the event further includes determining the point of convergence of the received input video streams, including
        for each person of said group of persons, storing a seat identification of said each person, and
        using the stored seat identifications of said group of persons to determine the point of convergence of the input video streams;
    each of the persons of the group of persons has a video recording device recording the event;
    one of the persons of the group of persons is equipped with Augmented Reality equipment that connects to one of the video recording devices that is recording the event; and, according to movements of the one person, the one person moves a viewpoint around the event, as if the one person was physically at the event; and
    the selecting the plurality of input video streams further includes, before the event begins, assessing and determining the group of people present at the event, and obtaining the popularity values for the group of people.

2. The method according to claim 1, wherein the paying each person of the plurality of persons based at least partially on a portion of the combined video stream includes paying each person of the plurality of persons based on a number of the specified viewers that watch the portion of the combined video stream.

3. The method according to claim 1, wherein:
    the receiving input video streams from each person of a plurality of persons includes simultaneously receiving the plurality of input video streams;
    the generating a combined video stream from the plurality of input video streams includes generating a 360 degree montage video stream of the event from the plurality of input video streams; and
    the streaming the combined video stream to specified viewers includes streaming the combined video stream to one or more of the plurality of persons at the event.

4. The method according to claim 1, wherein the streaming the combined video stream to specified viewers includes streaming the combined video stream during the event to one or more of the plurality of persons at the event.

5. The method according to claim 1, wherein the event has a defined end, and the generating a combined video stream includes starting the generating the combined video stream before the end of the event.

6. The method according to claim 1, wherein:
    the receiving an input video stream from each person of a plurality of persons includes storing the received input streams in a content database; and
    the generating a combined video stream of the event from the plurality of input video streams includes storing the combined video stream in the content database.

7. The method according to claim 1, further comprising:
    receiving feedback from the specified viewers about the combined video stream; and
    revising the combined video stream based on the feedback from the specified viewers to generate a revised version of the combined video stream.

8. The method according to claim 7, wherein:
the receiving feedback from the specified viewers includes analyzing the feedback to determine a defined measure associated with each of the plurality of input video streams; and
the revising the combined video stream includes revising the combined video stream based on the determined defined measures associated with the plurality of video streams.

9. The method according to claim 1, wherein the receiving an input video stream from each of a plurality of persons includes:
storing data about each of the video streams in a blockchain comprising a plurality of blocks; and
periodically creating new blocks for the blockchain, and storing in each new block information received about each of the video streams since a defined time.

10. A system for generating a video stream of an event, comprising:
one or more databases for storing data: and
one or more processor units for transmitting data to and receiving data from the one or more databases, the one or more processor units configured for:
receiving an input video stream from each person of a group of persons at different locations at the event;
generating a combined video stream of the event from the input video streams, including
for each of the input video streams, determining whether the each input video stream shows content within an area of a point of convergence of the received input video streams,
selecting for the combined video stream, a plurality of the input video streams showing content in the area of the point of convergence, including selecting the plurality of the video streams based on popularity values of the persons of said group of persons, wherein the plurality of input video streams are from a plurality of persons of said group of persons, and
joining together at least a portion of each of the plurality of input video streams to form the combined video stream of the event;
streaming the combined video stream to specified viewers; and
generating payment data for paying each person of the plurality of persons based at least partially on a portion of the combined video stream that incorporates the at least a portion of the input video stream from the each person, including
counting an amount of time each of the specified viewers watches the combined video stream, and
paying each person of the plurality of persons based on the counted amount of time the specified viewers watch the combined video stream; wherein:
the generating a combined video stream of the event further includes determining the point of convergence of the received input video streams, including
for each person of said group of persons, storing a seat identification of said each person, and
using the stored seat identifications of said group of persons to determine the point of convergence of the input video streams;
each of the persons of the group of persons has a video recording device recording the event;
one of the persons of the group of persons is equipped with Augmented Reality equipment that connects to one of the video recording devices that is recording the event; and, according to movements of the one person, the one person moves a viewpoint around the event, as if the one person was physically at the event; and
the selecting the plurality of input video streams further includes, before the event begins, assessing and determining the group of people present at the event, and obtaining the popularity values for the group of people.

11. The system according to claim 10, wherein the generating payment data includes generating payment data for paying each person of the plurality of persons based on a number of the specified viewers that watch the portion of the combined video stream.

12. The system according to claim 10, wherein:
the receiving input video streams from each person of a plurality of persons includes simultaneously receiving the plurality of input video streams;
the generating a combined video stream from the plurality of input video streams includes generating a 360 degree montage video stream of the event from the plurality of input video streams; and
the streaming the combined video stream to specified viewers includes streaming the combined video stream to one or more of the plurality of persons at the event.

13. The system according to claim 10, wherein the one or more databases includes a content database for storing the received input streams and the combined video stream.

14. The system according to claim 10, wherein the one or more processor units are configured for:
receiving feedback from the specified viewers about the combined video stream; and
revising the combined video stream based on the feedback from the specified viewers to generate a revised version of the combined video stream.

15. A computer readable program device for generating a video stream of an event, the computer readable program device comprising:
a computer readable storage medium having program instructions embodied therein, the program instructions executable by a computer to cause the computer to perform the method of:
receiving an input video stream from each person of a group of persons at different locations at the event;
generating a combined video stream of the event from the input video streams, including
for each of the input video streams, determining whether the each input video stream shows content within an area of a point of convergence of the received input video streams,
selecting for the combined video stream, a plurality of the input video streams showing content in the area of the point of convergence, including selecting the plurality of the video streams based on popularity values of the persons of said group of persons, wherein the plurality of input video streams are from a plurality of persons of said group of persons, and
joining together at least a portion of each of the plurality of input video streams to form the combined video stream of the event;
streaming the combined video stream to specified viewers; and
generating payment data for paying each person of the plurality of persons based at least partially on a portion of the combined video stream that incorporates the at least a portion of the input video stream from the each person, including
counting an amount of time each of the specified viewers watches the combined video stream, and paying each person of the plurality of persons based on the counted amount of time the specified viewers watch the combined video stream; wherein:

the generating a combined video stream of the event further includes determining the point of convergence of the received input video streams, including for each person of said group of persons, storing a seat identification of said each person, and using the stored seat identifications of said group of persons to determine the point of convergence of the input video streams;

each of the persons of the group of persons has a video recording device recording the event;

one of the persons of the group of persons is equipped with Augmented Reality equipment that connects to one of the video recording devices that is recording the event; and, according to movements of the one person, the one person moves a viewpoint around the event, as if the one person was physically at the event; and the selecting the plurality of input video streams further includes, before the event begins, assessing and determining the group of people present at the event, and obtaining the popularity values for the group of people.

16. The computer readable program device according to claim 15, wherein the generating payment data includes generating payment data for paying each person of the plurality of persons based at least partially on a portion of the combined video stream includes paying each person of the plurality of persons based on a number of the specified viewers that watch the portion of the combined video stream.

17. The computer readable program device according to claim 15, wherein:

the receiving input video streams from each person of a plurality of persons includes simultaneously receiving the plurality of input video streams;

the generating a combined video stream from the plurality of input video streams includes generating a 360 degree montage video stream of the event from the plurality of input video streams; and the streaming the combined video stream to specified viewers includes streaming the combined video stream to one or more of the plurality of persons at the event.

* * * * *